Patented Feb. 23, 1932

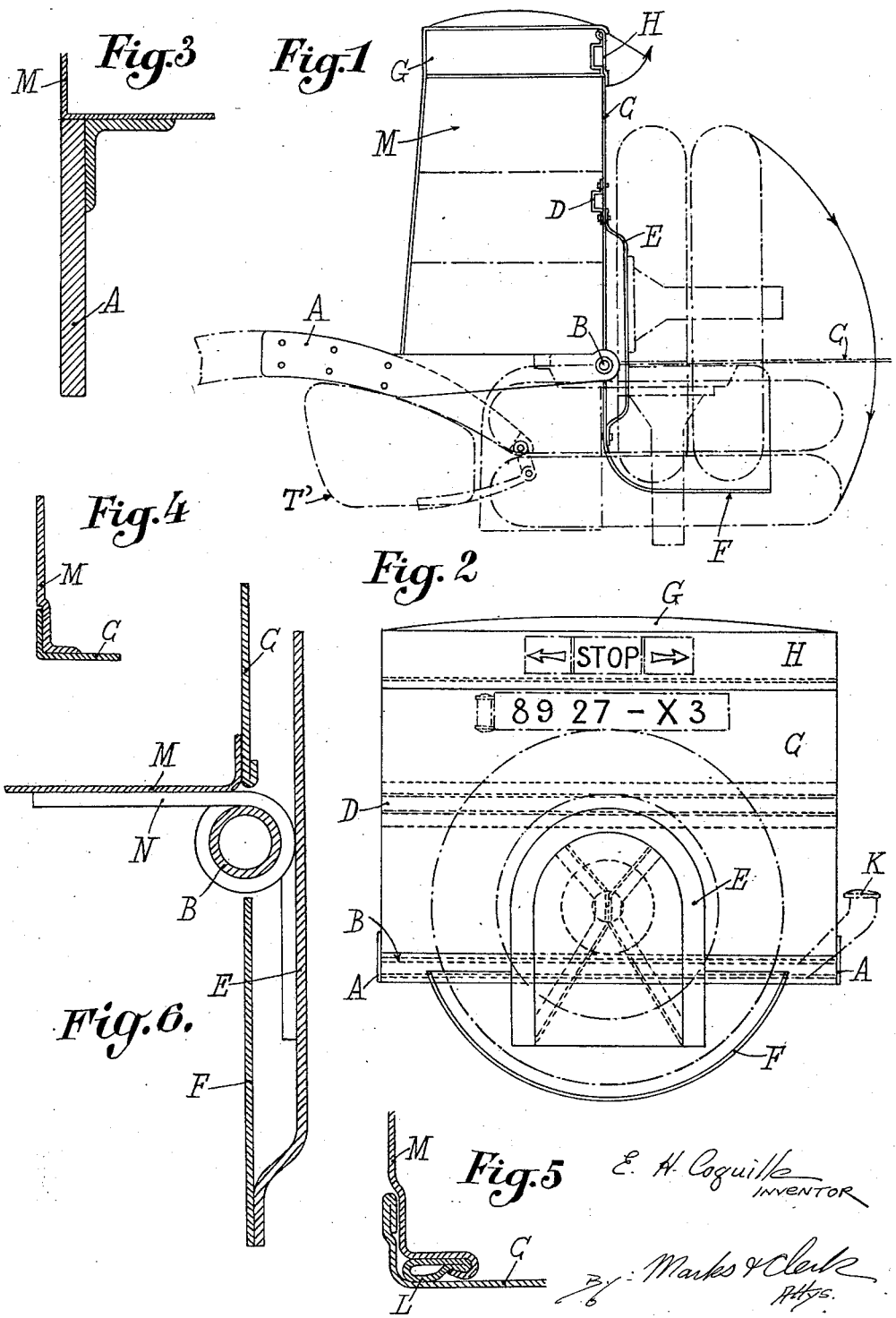

1,846,544

UNITED STATES PATENT OFFICE

EMILE HENRI COQUILLE, OF PARIS, FRANCE, ASSIGNOR TO SOCIETE ANONYME DES USINES CHAUSSON, OF ASNIERES, FRANCE

REAR BOX DEVICE FOR MOTOR VEHICLES

Application filed November 2, 1927, Serial No. 230,633, and in France July 6, 1927.

My invention relates to a rear box device for motor vehicles, which is so disposed that it may be utilized to contain or support various cases or valises, or the like, and also to contain or support numerous accessories such as a tool-chest, extra vehicle wheels, official plate, signal devices, and the like.

In the appended drawings, which are given solely by way of example:

Fig. 1 is a side view of a construction of the box, according to the invention, and Fig. 2 is a corresponding rear view.

Fig. 3 shows means for securing the box to its support.

Figs. 4, 5 and 6 are detail sectional views.

As shown in Figs. 1, 2 and 3, the box M is mounted upon two brackets A which are bolted or otherwise secured to the vehicle frame; said brackets are connected together at the rear by a tube or rod B which serves as a pivoting axle for the opening panel or lid C. Said panel or lid consists of a sheet metal member, strengthened by the cross piece D upon which is mounted the plate E which serves to carry the extra vehicle wheels. Said plate extends below the axle B so as to form an abutment when the lid C is opened.

I may form a tight joint between the lid C and the body of the box, (Figs. 4 or 5). In Fig. 5, the tight joint comprises the india rubber tube L which is held by a rolled edge of the member M. Said tube may be replaced by any suitable packing.

The major part of the reversing couple occasioned by the fact that the said extra wheels are overhung may be balanced by two springs N wound on the tube B, whereof one end is in contact with the bottom of the box M and the other end is in contact with the plate E (Fig. 6).

The concave member F serves as a mudguard for the said wheels, and is secured to the plate E; said concave member F and said plate E are so disposed with reference to the lid C as to allow a certain space above the top of the wheels, in which is disposed the official plate, as shown in Fig. 2.

Upon the said box M is disposed a toolchest G to which access is afforded by the hinged cover H which may optionally be opened together with the said box lid. The cover H may also serve as a signal device, and for this purpose it may be cut out in such manner as to offer the indications "stop" and the arrows indicating changes in the steering, without any projecting parts, the lighting devices being placed in the said tool chest.

The said covering or closing arrangements are of such nature as to offer the maximum protection against water or dust.

Figure 7:
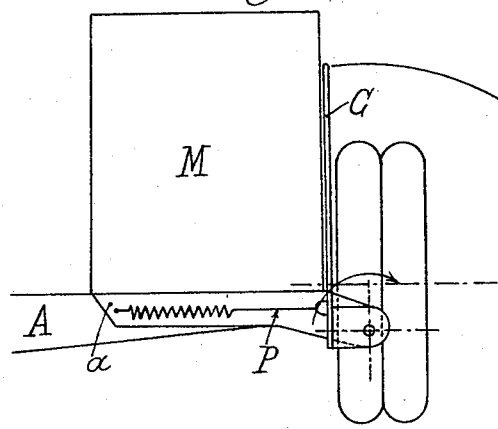
Fig. 7 shows a modified form of the balancing device shown in Fig. 1.

The aforesaid balancing device may be constructed as shown in Fig. 7, in which one or more springs P, subjected to traction, are attached at one end to the box M and at the other end to the box lid C. The attaching points of the springs are such that the lid C can be readily manipulated.

Instead of being secured to the brackets A as shown in Fig. 3, the box M may be mounted on said brackets by suspension means of an elastic or jointed nature.

Figure 8:
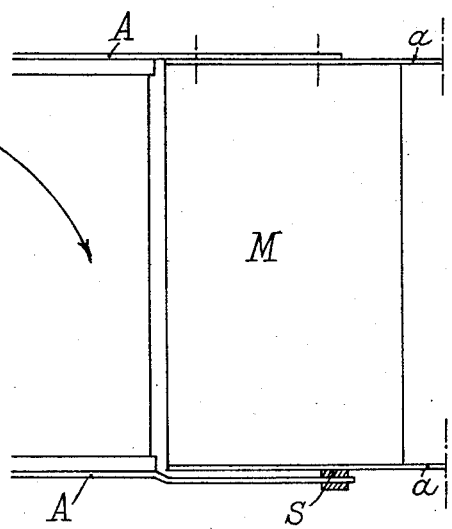
Figs. 8 to 11 represent various arrangements for the suspension of the box on its support.

In Fig. 8, one side of the box M is rigidly secured to the bracket A by the metal fitting $a$; on the other side of the box, a joint S is interposed between the bracket A and the fitting $a$.

Figure 9:
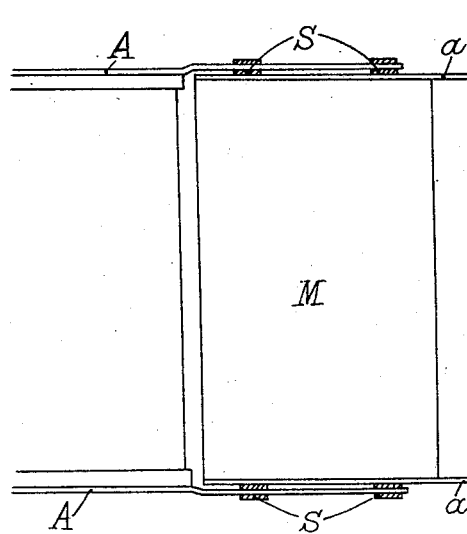

In Fig. 9, the box M is suspended at four points by the four joints S which are disposed between the members A and $a$.

Figure 10:
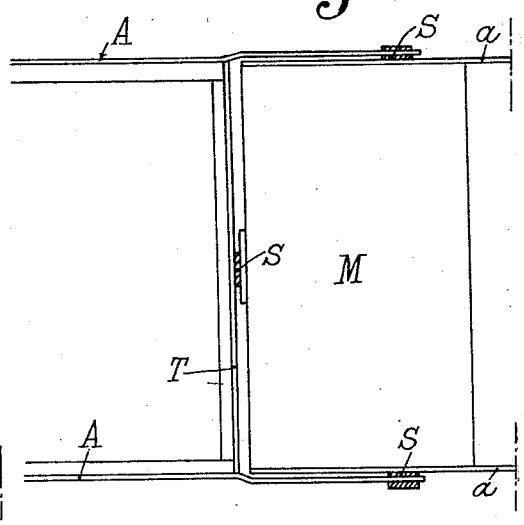

In Fig. 10, three joints are employed, comprising two between the members A and $a$ and a third mounted on the cross-piece T.

Figure 11:
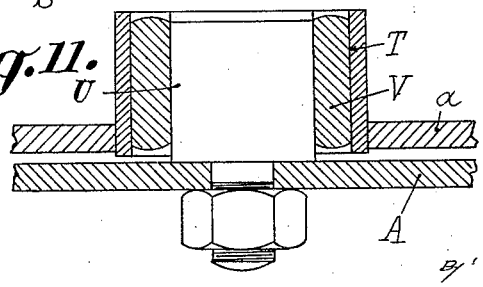

The joints S may consist of ball-joints, springs, india rubber washers, or the like. For this purpose I may employ (Fig. 11) the known joints designated as "Silentbloc", which comprise, in principle, a socket T secured to the box fitting $a$, an axle U mounted on the bracket A of the vehicle frame, and an india rubber sleeve V which is placed between the said socket and axle and is greatly compressed and elongated in this position whereby it will adhere strongly to the said parts.

The box M preferably consists of pressed sheet metal, so that it can be manufactured for a very small cost.

Obviously, the aforesaid form of construction which comprises a rear hinged lid, might be modified without departing from the principle of the invention, and the rear panel may be permanently secured, the access to the said box being afforded at the sides. The support for the extra wheels may comprise attaching means adapted for any system of wheels, irrespectively of the manner in which they are secured.

In the case in which the filling of the rear fuel tank T', which is herein disposed below the box M and the said wheel support, should be effected at the upper part of the tank, a connecting neck K may be provided whereby the tank may be filled at the side.

Obviously, the general apparatus according to the invention may be painted or enamelled to match the colours of the vehicle body, and should this latter consist of artificial leather, the said apparatus may be similarly faced.

Having now described my invention, what I claim as new and desire to secure by Letters Patent is:

1. In a rear box for motor vehicles adapted to contain valises, a rear wall for said box, a support attached to said rear wall and adapted to carry extra vehicle wheels, side brackets secured to the vehicle frame and adapted to support said box, and a stationary axle secured to said side brackets and on which said rear wall is adapted to be pivoted.

2. In a rear box for motor vehicles, a horizontal partition dividing said box into an upper tool compartment and a lower luggage compartment, a rear lid for said lower compartment, a support attached to said rear lid and adapted to carry extra wheels, a stationary axle on which said rear lid is adapted to be pivoted and an independent cover for said upper compartment hingedly mounted on the upper part of said box, whereby access is given to said upper compartment without removing said lid and said extra wheel carrier.

In testimony whereof I have signed my name to this specification.

EMILE HENRI COQUILLE.